July 10, 1962

J. S. COURTNEY-PRATT 3,043,960

HIGH SPEED SHUTTER

Filed Oct. 14, 1960

INVENTOR
J. S. COURTNEY-PRATT
BY
H. O. Wright
ATTORNEY 3,043,960
HIGH SPEED SHUTTER
Jeofry S. Courtney-Pratt, Springfield, N.J., assignor to Bell Telephone Laboratories, Incorporated, New York, N.Y., a corporation of New York
Filed Oct. 14, 1960, Ser. No. 62,583
6 Claims. (Cl. 250—213)

This invention relates to optical devices. More particularly, it relates to electrically operated optical devices having extremely fast response time.

This is a companion application to my copending application Serial No. 62,573 filed on October 14, 1960, concurrently with the present application.

In very high speed photography an exposure interval as short as $10^{-9}$ second or even $10^{-10}$ second is deemed essential for a number of purposes, such, for example, as determining the characteristics of the flame front of an explosion.

Shutter mechanisms of the prior art dependent upon the movement of mechanical parts usually cannot even approach reliable operation for such short exposure intervals in view of friction and/or the effects of the inertia of and "play" in the moving parts.

Various prior art shutter devices dependent upon electrical control also have not heretobefore been able to closely approach the above indicated speed of operation because of large capacitance or inductive effects inherent in the electrical control apparatus and circuits employed.

In accordance with the present invention, it is proposed to attain the above indicated operated speed by complementary segmentation of the image to be photographed and masking means interposed before and after the exposure, the image and mask segments being "interlaced" in position during an exposure, making it possible to substantially reduce the extent of movement necessary in making an exposure. Very fast acting electronic deflecting arrangements can then provide the reduced movement required, thus providing the extremely short interval of exposure desired.

A principal object of the invention is, accordingly, to eliminate difficulties ordinarily encountered when it is desired to obtain very short image exposure times in high speed photography systems and the like.

Other objects, features and advantages of the invention will become apparent from a perusal of the following detailed description of an illustrative embodiment of the invention.

Figure 1:
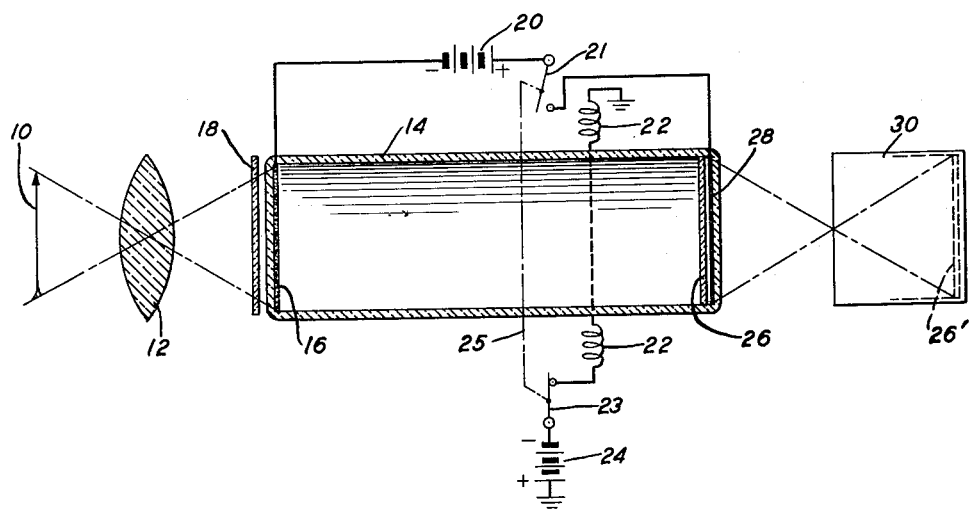
FIG. 1 illustrates in schematic diagram form a specific illustrative embodiment of the invention.

In more detail in FIG. 1, an image of object 10 is focussed by lens 12 on the photosensitive electron-emitting cathode surface 16 of a substantially conventional image converter tube 14 causing the various points of cathode 16 to emit electrons in proportion to the intensity of the image at each point, respectively. The electrons would normally be caused to impinge upon the fluorescent screen 28 at the other end of tube 14, under the influence of the potential difference maintained by potential source 20, creating a visible image of object 10 on fluorescent screen 28 in a manner well known and extensively employed by those skilled in the art. An important prior art use of the image converter tube is, of course, to convert infrared images focussed on the cathode (which are not visible to the human eye) into visible images on the fluorescent screen at the other end of the tube. It is, accordingly, obvious that systems of the invention can readily be adapted to operate where the circumstances favor the use of infrared rather than visible light for initially illuminating the objects to be photographed. A substantially conventional camera 30 can then be employed to photograph the image appearing on screen 28. Switch 21 permits removal of the potential of source 20 from screen 28. With this switch open, electrons from cathode 16 would of course not be drawn to screen 28. Cathode 16, screen 28 and the lens of camera 30 must, of course, be shielded by opaque means (not shown) from extraneous light.

In accordance with the present invention a mask 18 is so placed as, for example, immediately adjacent the cathode 16, that the image impinging upon cathode 16 consists, for instance, of a plurality of evenly spaced thin parallel lines. Were a more sophisticated lens system such as a microscope objective employed, the mask 18 could well be placed at an image plane between the component lenses of the multiple lens system.

Figure 2:
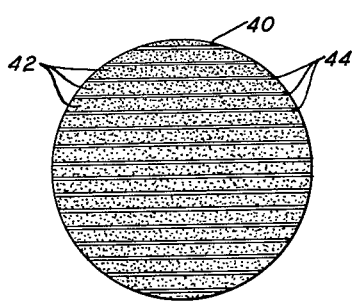
FIG. 2 illustrates a form of mask to be used adjacent the cathode of the image converter tube of FIG. 1.

Mask 18 can have, for example, alternate narrow transparent parallel strips and somewhat wider opaque parallel strips arranged as illustrated in FIG. 2, where mask 40 has narrow transparent strips 44 alternating with wider opaque strips 42. The object of the masks 18 and 40 is to present the cathode 16 of the image converter tube an image consisting of parallel spaced narrow lines separated by somewhat broader strips in which no light is permitted to reach the cathode 16 of the tube 14. For example, depending upon the quality of the "picture" to be reproduced from 50 to 150 lines per inch should be employed, the width of the lines being approximately one-tenth of the spacing between lines. An opaque strip would, of course, serve to separate each line from its nearest neighboring line on each side.

A further alternative would be, of course, to remove all active material from cathode 16 except for that situated along the narrow lines on which the light from the transparent strips strikes the cathode 16, in which case mask 18 could, obviously, be omitted. This, of course would render the tube somewhat less useful for purposes other than those of the present invention.

Figure 3:
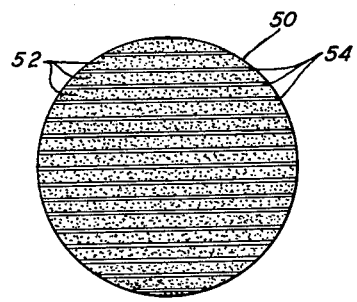
FIG. 3 illustrates a form of mask which can be used to form a segmented image in systems of the invention.

In furtherance of the concept and objects of the invention, a mask 26 is placed, for example, adjacent the left or near side of the fluorescent screen 28 of FIG. 1. Alternatively, a mask 26' can be placed in the camera 30 immediately in front of the emulsion on which the picture is to be taken. Masks 26 or 26' can be as shown in more detail as mask 50 of FIG. 3 and are substantially identical to mask 18 except that the opaque strips (52 of FIG. 3) of masks 26 and 26' are aligned so that the narrow line images projected from cathode 16 will, in the absence of a deflecting force, be centered on strips 52 and substantially no energy will consequently impinge upon the emulsion of the film or plate in camera 30.

If the electrons traversing tube 14 are deflected transversely to the strips of the masks by half the center-to-center distance between adjacent opaque strips then in effect the transparent fine lines of mask 18 will be registered with the transparent strips or slits 54 of mask 50 through which they will pass freely to impinge upon the emulsion of the film or plate of camera 30 and provide a line image corresponding to the image focussed by lens 12 on cathode 16 through mask 18. Relatively quite short exposure intervals could be obtained, therefore, by momentarily closing and opening switch 23 with the current from potential source 24 adjusted to deflect the lines by half the center-to-center distance between adjacent opaque strips.

In order to obtain a very much shorter exposure time, the electrons are initially deflected vertically by the magnetic field of coils 22, when energized by source 24 upon closure of switch 23, the full center-to-center distance between opaque strips. Then switch 23 is suddenly opened causing the electrons to shift back to their original positions passing across the transparent strips or slits 54 of FIG. 3 and in so doing momentarily creating a line image on the camera film or plate. Since the sweeping distance is very small, both the inductance of coils 22 and the required current can be small. Thus the sweep time and the exposure interval can likewise be very small, for example $10^{-9}$ second or less. It should be noted that in this case the exposure interval is approximately one-tenth the short sweep time for the parameters stipulated above.

Preferably, switch 23 can be an instantaneously operative (disconnecting) switch of any of several types of electronic switching devices well known and extensively used by those skilled in the art. For specific example, it can be a conventional tetrode vacuum tube, the small current required by coils 22 being the plate current flowing through the tube when the tube is conducting and being easily instantaneously interrupted by the application of an appropriate electrical pulse to the control grid of the tube in a manner well known and extensively employed for like purposes in the art.

It should be noted that electrostatic deflecting means could be employed in lieu of the electromagnetic means illustrated. Electrostatic means must be carefully designed, however, as is well known in the art, to minimize distortion of the image provided by the image converter tube.

Figure 4:
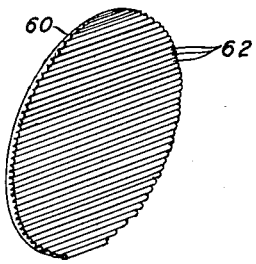
FIG. 4 illustrates a form of mask complementary to that of FIG. 3.

In FIG. 4 an alternative form of mask 60 which can be interposed between lens 12 and cathode 16 of FIG. 1 in place of mask 18 is illustrated and comprises a plurality of cylindrical lenslets 62 embossed or otherwise attached to one side of mask 60. The lenslets 62 will then concentrate the light from lens 12 into spaced bright parallel lines on cathode 16 and operation of the overall arrangement of FIG. 1 will obviously be essentially as for the case in which mask 18 was employed. Of course, light which would be blocked off by the opaque strips of mask 18 is, by the focussing action of lenslets 62, used to intensify the thin spaced lines reaching cathode 16.

As a still further alternative, the masks could pass a sufficient number of suitably distributed spots or points to form an image, instead of complete lines, and then spherical lenslets could be embossed upon or otherwise secured to the side of mask 60 in lieu of the cylindrical lenslets.

A further refinement in the operation of the over-all system of FIG. 1 is indicated by the "gang line" 25, the function of which is to synchronize a momentary closing of switch 21 with the opening of switch 23 so that the chance of "spillover" of electrons as, for example, from the opaque strips of mask 26 to screen 28 during the greater portion of intervals preceding and following the operation of opening the switch 23 is substantially eliminated. Switch 21, for example, should close a microsecond before switch 23 closes and open a microsecond after switch 23 is opened. Numerous suitable synchronizing arrangements for operating two switching devices in any precise desired timed relation are, of course, well known in the art. A detailed description of such an arrangement would therefore be superfluous here.

Numerous and varied modifications and rearrangements of the illustrative embodiments exemplified in the drawing will readily occur to those skilled in the art within the spirit and scope of the principles of the present invention. No attempt to exhaustively illustrate all such variations has here been made.

What is claimed is:

1. A camera shutter mechanism having an extremely short exposure interval comprising an electronic image converter tube having a photosensitive electron emitting cathode surface and an electron sensitive fluorescent screen spaced in substantially parallel planes, a source of potential interconnecting the cathode and the fluorescent screen surfaces to draw electrons from the cathode surface to impinge upon the fluorescent screen surface, a first mask interposed between the object to be photographed and the cathode surface to restrict the passage of energy to the cathode surface to a plurality of regularly spaced fine parallel lines, a second mask interposed adjacent the fluorescent screen surface to restrict the passage of electrons to the fluorescent surface to a like plurality of regularly spaced fine parallel lines and electrically controlled means for deflecting electrons traversing the tube from cathode to screen to momentarily direct the electrons to impinge upon the portions of the second mask which pass electrons.

2. The mechanism of claim 1, the second mask being positioned to interpose opaque strips in the electron paths in the absence of a deflecting force, the deflecting means being initially adjusted to deflect the electrons by one center-to-center spacing betwen adjacent opaque strips, and means for instantaneously disabling the deflecting means whereby the electrons sweep across the transparent strips of the second mask in returning to their no-deflection force positions.

3. The mechanism of claim 2 and means connecting the potential between the cathode and fluorescent screen of the converter tube for a short interval only, the interval including and being substantially centered about the instant at which the deflection means is disabled.

4. The mechanism of claim 1 in which the deflecting means is of the electromagnetic type.

5. The mechanism of claim 2 in which the deflecting means is of the electromagnetic type.

6. The mechanism of claim 3 in which the deflecting means is of the electromagnetic type.

References Cited in the file of this patent

UNITED STATES PATENTS

| | | |
|---|---|---|
| 2,859,377 | Clemens et al. | Nov. 4, 1958 |
| 2,927,215 | Allen et al. | Mar. 1, 1960 |